United States Patent [19]

Yamada et al.

[11] Patent Number: 4,610,480
[45] Date of Patent: Sep. 9, 1986

[54] BUILT-IN TYPE SAFETY SEAT BELT SYSTEM FOR RECLINING VEHICLE SEAT

[75] Inventors: Hisao Yamada, Aichi; Toshiaki Shimogawa; Teruhiko Koide, both of Okazaki; Masahiro Iwatsuki, Kariya, all of Japan

[73] Assignees: Nippon Soken, Inc., Nishio; Kabushiki Kaisha Tokai Rika Denki Seisakusho, Niwa, both of Japan

[21] Appl. No.: 704,590

[22] Filed: Feb. 22, 1985

[51] Int. Cl.⁴ .............................................. A62B 35/02
[52] U.S. Cl. .............................. 297/478; 242/107.4 A
[58] Field of Search ................................ 297/478, 379; 242/107.4 A

[56] References Cited

U.S. PATENT DOCUMENTS 2,899,146  8/1959  Barecki ........................ 297/478 X
3,948,460  4/1976  Kondziola ................... 242/107.4 A
4,069,988  1/1978  Pouget ........................ 242/107.4 A
4,164,337  8/1979  Blom ............................... 297/478
4,402,473  9/1983  Kubota et al. .
4,467,981  8/1984  Mori et al. .

FOREIGN PATENT DOCUMENTS 1282577  7/1972  United Kingdom ................ 297/478

Primary Examiner—Francis K. Zugel
Attorney, Agent, or Firm—Cushman, Darby & Cushman

[57] ABSTRACT

The safety seat belt system comprises an emergency-locking type seat belt retractor (ELR) mounted within a tiltable backrest of a reclining seat. The ELR is mounted rotatably on a support shaft horizontally extending within the backrest and rigidly secured to the backrest frame in such a manner that the ELR is suspended vertically from the support shaft regardless of any change in the angle of the backrest. The ELR is locked to the support shaft by a releasable locking mechanism operated by an actuating mechanism which is preferably linked to the reclining adjustment lever of the backrest reclining mechanism.

6 Claims, 5 Drawing Figures

BUILT-IN TYPE SAFETY SEAT BELT SYSTEM FOR RECLINING VEHICLE SEAT

BACKGROUND OF THE INVENTION (1) Field of the Invention

The present invention relates to a safety seat belt system for vehicles such as motor vehicles and, more particularly, to a safety seat belt system of the built-in type wherein all the major components of the system are incorporated on or in the vehicle seat itself and which is especially suitable for use with reclining vehicle seats provided with backrests adapted for adjustment of angle.

(2) Description of the Related Art

The various types of safety seat belt systems currently in use include two-point, three-point, and other types. Generally, in these seat belt systems, an end of a seat belt or webbing is securely anchored to a fixed point on the vehicle body, and the other end of the belt is retractably connected to a seat belt retractor to remove unnecessary slack in the seat belt.

Typically, a seat belt retractor comprises an emergency-locking-type retractor (ELR) provided with a retracting reel or shaft adapted to be locked when an emergency situation occurs in which the vehicle is subjected to sudden deceleration or stoppage by collision, and the like. The retracting reel is normally biased in one direction by a helical spring to wind up the seat belt with a relatively small winding force. Namely, when the user pulls the belt, the belt is unwound from the retractor against the action of the helical spring. Conversely, when the user releases the belt, the belt is retracted within the retractor and wound around the reel, to prevent the formation of slack in the belt. This provides the user with an increased flexibility of body movement during normal conditions in the vehicle. In an emergency situation, an inertia element senses any sudden deceleration of the vehicle and triggers a locking mechanism which locks the retracting reel, thereby preventing further unwinding of the seat belt and restraining any involuntary movement by the occupant.

Seat belt retractors of the general concept described above are widely used and are referred to as emergency-locking-type retractors (ELR).

In modern motor vehicles, it is customary to design the seat so that it is adjustable in various dimensions to ensure that the occupant can assume any desired comfortable position. Thus, the backrest of the seat is hinged to the seat cushion, to allow adjustment of the rake or reclining angle of the backrest. In addition, the seat is mounted on a slidable carriage, to allow adjustment of the seat in the fore-and-aft direction with respect to the vehicle floor. In some cases, seat lifting mechanisms are provided to allow adjustment of the height of the seat cushion with respect to the vehicle floor. In such adjustable vehicle seats, it would be a great improvement if all the major components of the seat belt system, such as anchoring members, buckles, tongue plates, and retractors could be incorporated into the seat, so that these components move together with the seat during seat adjustment. Such an improvement would ensure a proper positioning of the seat belt with respect to the occupant, regardless of any changes in the position of the bakcrest and/or the fore-and-aft position of the seat cushion. In this specification, a safety seat belt system having all the major components thereof incorporated on or in the seat will be referred to as a built-in-type seat belt system.

For a built-in type safety seat belt system to be incorporated into a reclining seat, it is desirable to use an ELR in order to provide flexibility of movement for the user. In this case, the ELR may be built-in within the backrest of the seat. However, the conventional ELR is not suitable for such an arrangement because it includes an inertia sensing element in the form of a pendulum weight or an inertial ball, which must be held in a predetermined inoperative position to ensure the proper function of the retractor. Namely, if the angle of the backrest is altered due to adjustment after the ELR is mounted to the backrest, then the pendulum weight will be moved into a non-vertical operative position or a ramped tray supporting the inertial ball will be slanted into an operative position, and thus will incorrectly indicate an emergency situation of the vehicle. For this reason, it has been difficult to combine a reclining seat with a built-in type seat belt system including an ELR.

SUMMARY OF THE INVENTION

The object of the present invention is to provide a safety seat belt system of the built-in type which is suitable for use with a reclining seat and which can enjoy the advantages of the ELR.

This invention provides a built-in type safety seat belt system having a horizontal support rigidly secured to the frame of the seat backrest. An ELR is housed within the backrest and is rotatably mounted on the horizontal support in such a manner that the inertia element such as the pendulum weight is held in a predetermined inoperative position regardless of any change in the angle of the seat backrest. Toward this end, the ELR may be provided with a pair of spaced support members such as brackets having upper ends mounted rotatably on the horizontal support and lower ends connected to the ELR so that the ELR is suspended from the horizontal support in such a manner that it remains in a substantially vertical position under the action of gravity.

The seat belt system also includes a seat belt anchored at one end to a point on the seat remote from the upper region of the backrest and extended from there across the front of the backrest and up to the top of the backrest to form a shoulder belt section. The belt is then passed through an aperture in the top of the backrest and led inside the backrest wherein it is fastened to the ELR in a retractable manner.

The seat belt system further includes a locking mechanism which releasably locks the ELR with respect to the horizontal support. The locking mechanism is selectively released by a manually operable actuating mechanism.

When wishing to adjust the angle of the backrest, the user first operates the actuating mechanism to release the locking mechanism, thereby permitting the ELR to freely rotate about the horizontal support. The user then actuates the reclining adjusting mechanism of the seat to tilt the backrest to a desired angle. During this tilting of the backrest, the ELR will rotate about the horizontal support and remain suspended therefrom in a vertical position through the action of gravity, and thus the attached inertia sensing element is similarly held in the predetermined inoperative position. The user then releases the reclining adjusting mechanism to lock the backrest and operates the actuating mechanism to release the locking mechanism, thereby locking the ELR into position with respect to the horizontal support. In this manner, it is possible to maintain the ELR in a constant vertical position, irrespective of the angle of backrest, thereby ensuring the proper functioning of the ELR.

Thus, the safety seat belt system according to the present invention can provide the advantages of both the ELR and the built-in seat belt system while retaining the full advantages of a reclining seat, thereby ensuring user comfort when wearing the seat belt during normal conditions in the vehicle and reliable operation of the safety belt system when an emergency situation occurs.

More specifically, according to the present invention, the releasable locking mechanism may comprise a toothed wheel fixed to the ELR for rotation therewith about the horizontal support, a support member secured to the horizontal support to move in accordance with the horizontal support when the backrest is tilted, a detent lever pivotably mounted to the support member and having a pawl engageable between the teeth of the wheel, and spring means for biasing the pawl into engagement with the toothed wheel.

Preferably, the actuating mechanism comprises a cable such as a Bowden cable having one end connected to the detent lever of the locking mechanism. The other end of the cable may be advantageously connected to a reclining adjuster lever of the reclining adjusting mechanism of the seat. With this arrangement, when and eachtime the user operates the reclining adjuster lever to adjust the angle of the backrest, the cable will pull automatically on the detent lever, causing it to swing in such a manner that the pawl is disengaged from the toothed wheel thereby permitting the ELR to freely rotate about the horizontal support and to swing into the vertical position. By releasing the reclining adjuster lever upon completion of the seat angle adjustment, the cable will then return to its original position thereby allowing the pawl to reengage with the toothed wheel so that the ELR is automatically locked in position with respect to the horizontal support.

Alternatively, the cable may be connected to a parking brake lever of the vehicle in such a manner that when the parking brake lever is operated, the cable pulls on the detent lever and causes the pawl to disengage from the toothed wheel.

BRIEF DESCRIPTION OF THE DRAWINGS

The present invention will now be described in more detail with reference to the accompanying drawings, wherein like reference numerals indicate like parts and members.

DESCRIPTION OF THE PREFERRED EMBODIMENTS

Figure 1:
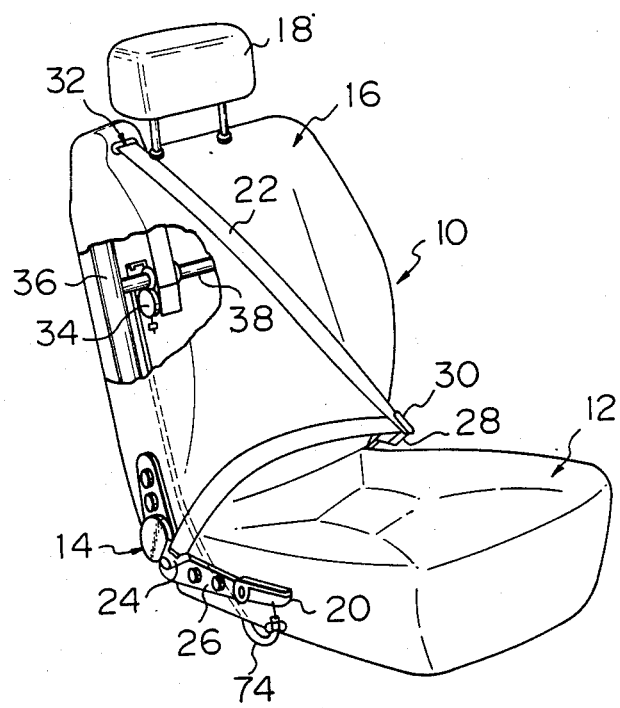
FIG. 1 is a perspective view of a reclining seat of a motor vehicle provided with a built-in-type safety seat belt system according to the present invention, the surface of the backrest being partly cut away to show the ELR.

FIG. 1 shows a reclining seat for a motor vehicle having a built-in-type three-point safety seat belt system. The vehicle seat 10 includes a seat cushion 12, a seat backrest 16 hinged to the seat cushion by means of a conventional reclining adjusting mechanism 14, and a headrest 18. The seat cushion 12 may be mounted on the vehicle floor (not shown) for sliding movement in the fore-and-aft direction by way of a conventional slide. As usual, the reclining adjusting mechanism 14 includes a reclining adjuster lever 20 for adjusting the angle of the backrest 16.

A seat belt 22 has one end anchored by an anchor plate or D-ring 24 to a lower right hinge plate 26 of the reclining adjusting mechanism 14. The belt 22 is passed through a tongue plate 30 releasably engaged with a buckle 28 secured to a lower left hinge plate (not shown); the section of the seat belt located between the anchor plate 24 and the tongue plate 30 forms the lap belt section of the seat belt system. The belt then extends diagonally and across the front of the backrest 16 to form a shoulder belt section and is thereafter drawn within the interior of the backrest 16 through a belt-pull-out slot 32 provided on the top right region of the backrest. The end of the seat belt 22 opposite the anchor plate 24 is connected to a retracting reel (not shown) of an emergency-locking-type retractor (ELR) 34 which is rotatably mounted on a horizontal shaft 38 rigidly connected to a frame 36 of the backrest 16.

Figure 2:
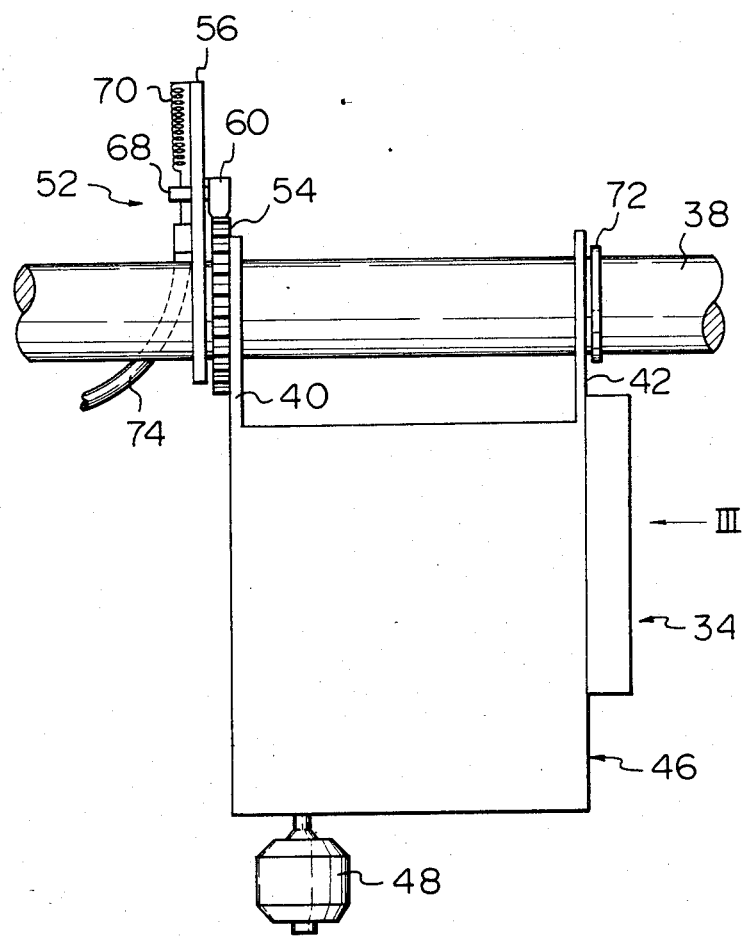
FIG. 2 is a front elevational view of the ELR provided with the locking mechanism and suspended from the horizontal support shaft.
Figure 3:
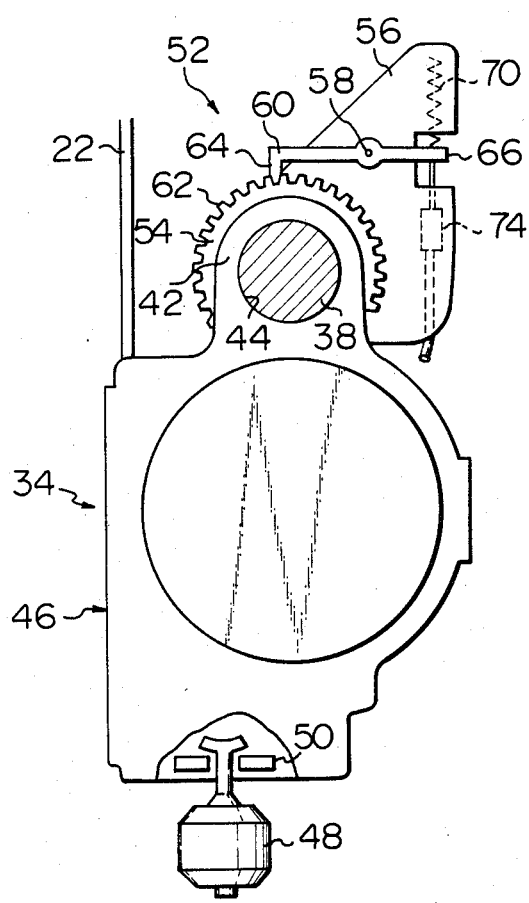
FIG. 3 is a side elevational view of the ELR and locking mechanism viewed in the direction of the arrow III of FIG. 2, with the retractor housing being partly cut away to show the support for the pendulum weight.

As shown in FIGS. 2 and 3, the ELR 34 is suspended from the shaft 38 by a pair of spaced brackets 40, 42 extending upward from the ELR. In the illustrated embodiment, the brackets 40, 42 are an integral part of the retractor housing 46. However, the brackets 40, 42 may be made as separate members and may be secured to the retractor housing by any conventional fastening means such as welding or bolting. Each bracket 40, 42 has a circular aperture 44 into which the shaft 38 is loosely inserted.

The retractor 34 differs from the conventional ELR only in that it is suspended from the shaft 38 by the brackets 40, 42, instead of being fixed to a stationary part of the vehicle such as a door pillar, as in the conventional seat belt system. Examples of an ELR applicable to the present invention are described in detail in U.S. Pat. No. 4,402,473 issued on Sept. 6, 1983 to Kubota et al. and in U.S. Pat. No. 4,467,981 issued on Aug. 28, 1984 to Mori et al., both assigned to the assignee of the present invention, the disclosure of which is incorporated by reference herein. The ELR 34 comprises an inertia sensing element in the form, for example, of a pendulum weight 48 which is supported by and suspended vertically from a horizontally extending support structure 50.

The ELR 34 is interlocked with the shaft 38 by means of a locking mechanism 52 serving to releasably lock the ELR 34 with respect to the shaft 38. The locking mechanism 52 comprises a toothed wheel 54 rigidly secured to the bracket 40 and adapted to rotate about the shaft 38 together with the ELR, a triangular support plate 56 welded or secured to the shaft 38 so as to tilt integrally with the backrest 16, and a detent lever 60 swingably secured to the support plate 56 by a pivot pin 58. The detent lever 60 has an end projecting at a right angle toward the wheel 54 to form a pawl 64 engageble between the teeth 62 of the wheel 54. A coil spring 70 is provided between the support plate 56 and a projection 68 at the rear end 66 of the lever 60 to bias the pawl 64 into engagement with the teeth 62. Preferably, the teeth 62 of the wheel 54 are spaced apart at an angular pitch equal to that of the reclining adjusting mechanism 14 of the backrest 16, so that the pawl 64 will fit smoothly between consecutive teeth 62 when the backrest 16 is locked at a selected angle. In the illustrated embodiment, the toothed wheel 54 is provided with teeth 62 throughout its circumference. However, for the purpose of the present invention, the teeth 62 may be formed only through an angle corresponding to the allowable angle of tilt of the backrest 16.

As shown in FIG. 2, the axial movement of the ELR 34 is confined, on the one hand, by the wheel 54 abutting against the support plate 56 and, on the other hand, by a circlip 72 fitted within an annular groove on the shaft 38.

The detent lever 60 of the locking mechanism 52 is operated through a Bowden cable 74 by the reclining adjuster lever 20 of the reclining adjusting mechanism 14. To this end, one end of the cable 74 is connected to the rear projection 68 of the detent lever 60 and the other end is linked to the reclining adjuster lever 20.

The support structure 50 for the pendulum weight 48 is adjusted in such a manner that the pendulum weight 48 assumes a vertical position when the locking mechanism 52 is released to allow the ELR to be freely suspended from the shaft 38 under the action of gravity.

The operation of the safety seat belt system according to the present invention is as follows.

FIG. 3 shows the arrangement of parts and members of the system during the ordinary condition of the backrest wherein the backrest is locked at an approximately vertical position. The cable 74 is relaxed so that the tension spring 70 urges the detent lever 60 in the counterclockwise direction to bring the pawl 64 into engagement with the ratchet wheel 54. Thus, the ELR 34 is locked immovably with respect to the shaft 38, with the pendulum weight 48 seated on the support structure 50 in a vertical position.

Figure 4:
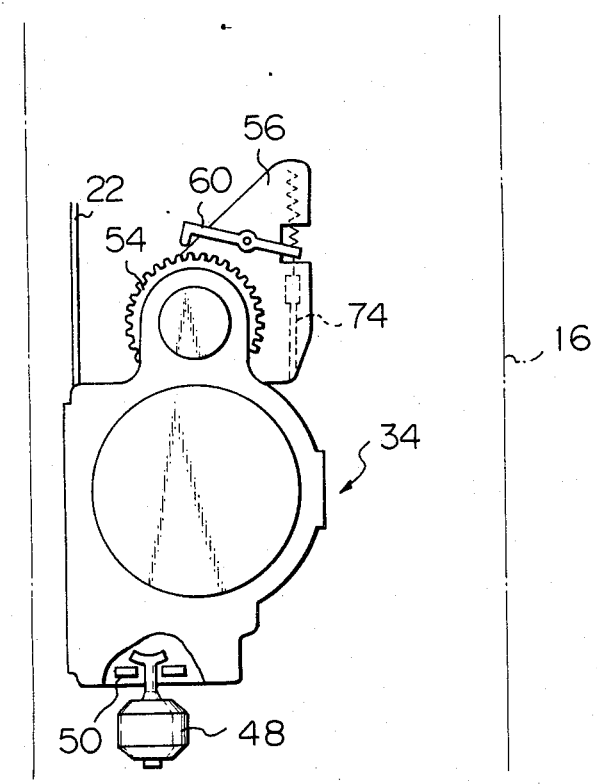
FIG. 4 is a view similar to FIG. 3 but showing the backrest in a vertical position and showing the locking mechanism released for angle adjustment.

When the reclining adjuster lever 20 is pulled to release the reclining adjusting mechanism for the purpose of adjusting the angle of the backrest, the Bowden cable 74 is necessarily tightened, causing the detent lever 60 to swing against the action of the spring 70 and move the pawl 64 away from the teeth of the wheel 54, as shown in FIG. 4, so that the ELR is then free to rotate about the shaft 38 in response to the tilting movement of the backrest.

Figure 5:
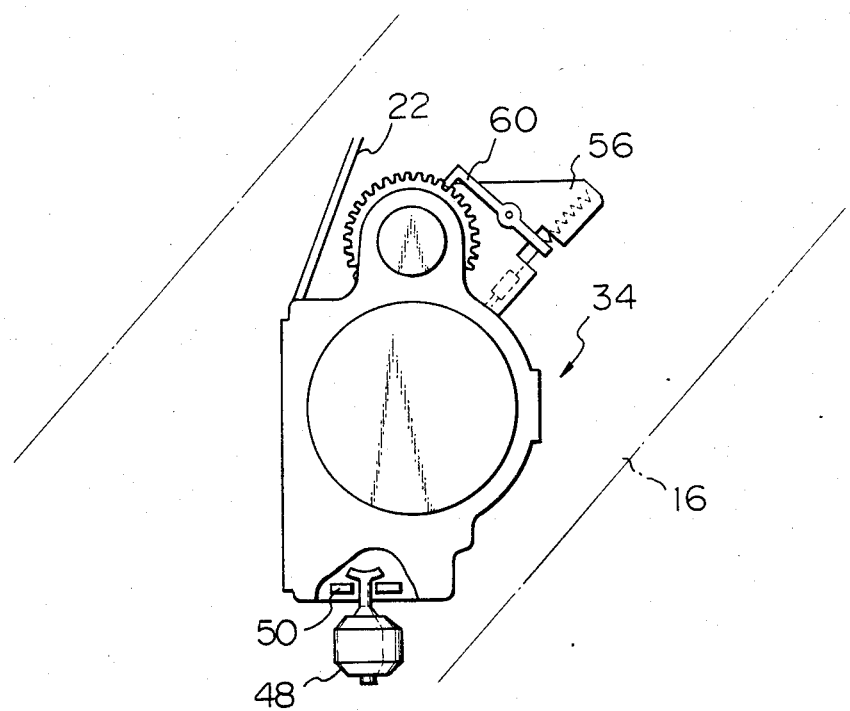
FIG. 5 is a view similar to FIG. 3 but showing the backrest after tilting and showing the locking mechanism activated to lock the ELR to the support shaft.

As the backrest 16 is tilted as shown by phantom lines in FIG. 5, the backrest frame 36 together with the horizontal support 38 will turn about the pivot axis of the hinge 14. However, the ELR will rotate with respect to the shaft 38 and remain in the vertical position, since it is suspended from the shaft 38 under the action of gravity. Thus, the change in the angle of the backrest will not affect the position of the ELR or the position of the pendulum weight.

When the reclining adjuster lever 20 is released after angle adjustment, the reclining adjusting mechanism locks the backrest at the new angle. Simultaneously, the pawl 64 of the detent lever 60 is allowed to engage with the toothed wheel 54, thereby locking the ELR 34 with respect to the shaft 38, so that the ELR will function to withstand any sudden tension in the belt likely to occur in an emergency situation of the vehicle.

In this manner, the ELR is locked to the shaft 38 with the pendulum weight held constantly in the vertical position required for proper operation of the ELR, regardless of any change in the angle of the backrest. This ensures that the ELR will function in the same manner as when it is attached to stationary part of the vehicle body.

In the alternative form of the present invention, the locking mechanism 52 may be activated and released by utilizing a parking brake lever of the vehicle. Thus, the Bowden cable 74 of the foregoing embodiment may be connected to the parking brake lever, instead of to the reclining adjuster lever 20. With this arrangement, when the parking brake lever is operated upon parking, the locking mechanism 52 will be released and allow the ELR to swing into the correct vertical position. When the parking brake lever is released to enable the vehicle to move, the ELR will be automatically locked to the shaft 38.

We claim:

1. A built-in-type safety seat belt system for use with a reclining vehicle seat having a seat backrest, with a frame, hinged for tilting movement to a seat cushion for adjustment of the angle thereof, which comprises:
   (a) a support horizontally extending within said seat backrest and rigidly secured to said backrest frame for movement therewith;
   (b) an emergency-locking-type seat belt retractor (ELR) housed within said seat backrest and having an inertial mass operable to lock the retractor in an emergency situation of the vehicle, said retractor being mounted for rotation on said horizontal support in such a manner that said retractor as a whole is moved under the action of gravity into a substantially vertical position wherein said inertial mass is held substantially in an inoperative position whatever the angle of the seat backrest;
   (c) a seat belt having one end anchored to a point on said seat remote from the upper region of the backrest, said seat belt having a section extending in front of and across the seat backrest from said anchored point to the upper region of the backrest to form at least a shoulder belt section, said seat belt having a section extending into the interior of said seat backrest through said upper region thereof, the other end of said seat belt being retractably connected to said retractor within said backrest;
   (d) means for releasably locking said retractor with respect to said horizontal support to prevent rotation of the retractor about said support; and
   (e) manually-operated actuating means for selectively releasing said locking means to permit said retractor to rotate about said support, whereby said retractor swings into an angular position such that said inertial mass is held in said inoperative position when said seat backrest is tilted.

2. A safety seat belt system according to claim 1, wherein said releasable locking means comprises a toothed wheel secured to said retractor for rotation therewith about said horizontal support, a support plate secured to said horizontal support, a detent lever pivoted to said support plate and having a pawl engageable between teeth of said wheel, and spring means for biasing said pawl of the detent lever into engagement with the teeth of said wheel, thereby locking the retractor with respect to the support, said actuating means acting on said detent lever to release the engagement of said pawl with said teeth.

3. A built-in-type safety seat belt system for use with a reclining vehicle seat having a seat backrest, with a frame, hinged for tilting movement to a seat cushion for adjustment of the angle thereof, which comprises:

(a) a support horizontally extending within said seat backrest and rigidly secured to said backrest frame for movement therewith;

(b) an emergency-locking-type seat belt retractor (ELR) housed within said seat backrest and having an inertial mass operable to lock the retractor in an emergency situation of the vehicle, said retractor being mounted for rotation on said horizontal support in such a manner that said inertial mass is held substantially in an inoperative position whatever the angle of the seat backrest;

(c) a pair of spaced support members suspending said retractor from said horizontal member, the upper ends of said support members being mounted rotatably to said horizontal support and the lower ends of said support members being secured to the sides of said retractor, so that said retractor tends to assume a substantially vertical position under the action of gravity when said seat backrest is tilted;

(d) a seat belt having one end anchored to a point on said seat remote from the upper region of the backrest, said seat belt having a section extending in front of and across the seat backrest from said anchored point to the upper region of the backrest to form at least a shoulder belt section, said seat belt having a section extending into the interior of said seat backrest through said upper region thereof, the other end of said seat belt being retractably connected to said retractor within said backrest;

(e) means for releasably locking said retractor with respect to said horizontal support to prevent rotation of the retractor about said support; said releasable locking means comprising:

a toothed wheel secured to said retractor for rotation therewith about said horizontal support, a support plate secured to said horizontal support, a detent level pivoted to said support plate and having a pawl engagable between teeth of said wheel, and spring means for biasing said pawl of the detent lever into engagement with the teeth of said wheel, thereby locking the retractor with respect to the support; and (f) actuating means for selectively releasing said locking means to permit said retractor to rotate about said support, whereby said retractor swings into an angular position such that said inertial mass is held in said inoperative position when said seat backrest is tilted, said actuating means acting on said detent lever to release the engagement of said pawl with said teeth.

4. A safety seat belt system according to claim 3, wherein said actuating means comprises a cable connected at one end thereof to said detent lever, the other end of said cable being connected to a reclining adjuster lever of said seat so that each time the adjuster lever is operated for the adjustment of the angle of the backrest, said adjuster lever tightens the cable causing the detent lever to swing to disengage the pawl from said teeth thereby permitting the retractor to assume said substantially vertical position.

5. A safety seat belt system according to claim 3, wherein said actuating means comprises a cable connected at one end thereof to said detent lever, the other end of said cable being connected to a parking brake lever of the vehicle so that each time said parking brake lever is operated, the cable is tightened causing the detent lever to swing to disengage said pawl from said teeth of the wheel thereby permitting the retractor to assume said substantially vertical position.

6. A safety seat belt system acccording to claim 3, wherein said inertial mass is a pendulum weight which is held in a substantially vertical position in said inoperative position.

* * * * *